(12) United States Patent
Shveidel et al.

(10) Patent No.: US 11,392,543 B2
(45) Date of Patent: Jul. 19, 2022

(54) SYSTEM AND METHOD FOR OPTIMIZING CAPACITY AND PERFORMANCE FOR SPARSE SNAPSHOTS

(71) Applicant: EMC IP Holding Company, LLC, Hopkinton, MA (US)

(72) Inventors: Vladimir Shveidel, Pardes-Hana (IL); Ronen Gazit, Tel Aviv (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 337 days.

(21) Appl. No.: 16/662,309

(22) Filed: Oct. 24, 2019

(65) Prior Publication Data

US 2021/0124714 A1    Apr. 29, 2021

(51) Int. Cl.
*G06F 16/11* (2019.01)
*G06F 3/06* (2006.01)

(52) U.S. Cl.
CPC .......... *G06F 16/128* (2019.01); *G06F 3/0604* (2013.01); *G06F 3/065* (2013.01); *G06F 3/067* (2013.01); *G06F 3/0689* (2013.01)

(58) Field of Classification Search
CPC .................................................. G06F 16/128
See application file for complete search history.

(56) References Cited

U.S. PATENT DOCUMENTS

| | | | |
|---|---|---|---|
| 2015/0113239 A1* | 4/2015 | Katori | G06F 3/0685 711/162 |
| 2015/0193314 A1* | 7/2015 | Ezra | G06F 3/065 711/162 |

* cited by examiner

*Primary Examiner* — Baoquoc N To
(74) *Attorney, Agent, or Firm* — Brian J. Colandreo; Mark H. Whittenberger; Holland & Knight LLP

(57) ABSTRACT

A method, computer program product, and computer system for creating, by a computing device, a snapshot related to a snapshot family, wherein an inheritance tree may be maintained for each snapshot family. A write to the snapshot may be received. A hash-based overwrite mapping data structure may be updated based upon, at least in part, receiving the write to the snapshot.

17 Claims, 5 Drawing Sheets

SYSTEM AND METHOD FOR OPTIMIZING CAPACITY AND PERFORMANCE FOR SPARSE SNAPSHOTS

BACKGROUND

Some storage clusters may apply a "copy-on-update metadata" method when creating a snapshot. This may have many example and non-limiting advantages, such as, e.g., it does not require any data copies, as just the metadata is involved, and the actual metadata (MD) page copying is made just when (and if) the new write operation is performed either to the original volume or to the snapshot and the corresponding MD page is diverged. However, this method may also create example and non-limiting problems and inefficiencies.

BRIEF SUMMARY OF DISCLOSURE

In one example implementation, a method, performed by one or more computing devices, may include but is not limited to creating, by a computing device, a snapshot related to a snapshot family, wherein an inheritance tree may be maintained for each snapshot family. A write to the snapshot may be received. A hash-based overwrite mapping data structure may be updated based upon, at least in part, receiving the write to the snapshot.

One or more of the following example features may be included. Creating the snapshot may include one of adding and registering a snapshot ID of the snapshot to the inheritance tree. A mapping metadata page for the snapshot may include one of changed and overwritten pointers. The mapping metadata page may be split when overflowed. The hash-based overwrite mapping data structure may track overwritten addresses for each snapshot inside the inheritance tree. The hash-based overwrite mapping data structure may identify whether offsets were overwritten inside the snapshot. The hash-based overwrite mapping data structure may identify the snapshot from which the offsets is inherited.

In another example implementation, a computing system may include one or more processors and one or more memories configured to perform operations that may include but are not limited to creating a snapshot related to a snapshot family, wherein an inheritance tree may be maintained for each snapshot family. A write to the snapshot may be received. A hash-based overwrite mapping data structure may be updated based upon, at least in part, receiving the write to the snapshot.

One or more of the following example features may be included. Creating the snapshot may include one of adding and registering a snapshot ID of the snapshot to the inheritance tree. A mapping metadata page for the snapshot may include one of changed and overwritten pointers. The mapping metadata page may be split when overflowed. The hash-based overwrite mapping data structure may track overwritten addresses for each snapshot inside the inheritance tree. The hash-based overwrite mapping data structure may identify whether were overwritten inside the snapshot. The hash-based overwrite mapping data structure may identify the snapshot from which the offsets is inherited.

In another example implementation, a computer program product may reside on a computer readable storage medium having a plurality of instructions stored thereon which, when executed across one or more processors, may cause at least a portion of the one or more processors to perform operations that may include but are not limited to creating a snapshot related to a snapshot family, wherein an inheritance tree may be maintained for each snapshot family. A write to the snapshot may be received. A hash-based overwrite mapping data structure may be updated based upon, at least in part, receiving the write to the snapshot.

One or more of the following example features may be included. Creating the snapshot may include one of adding and registering a snapshot ID of the snapshot to the inheritance tree. A mapping metadata page for the snapshot may include one of changed and overwritten pointers. The mapping metadata page may be split when overflowed. The hash-based overwrite mapping data structure may track overwritten addresses for each snapshot inside the inheritance tree. The hash-based overwrite mapping data structure may identify whether offsets were overwritten inside the snapshot. The hash-based overwrite mapping data structure may identify the snapshot from which the offsets is inherited.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
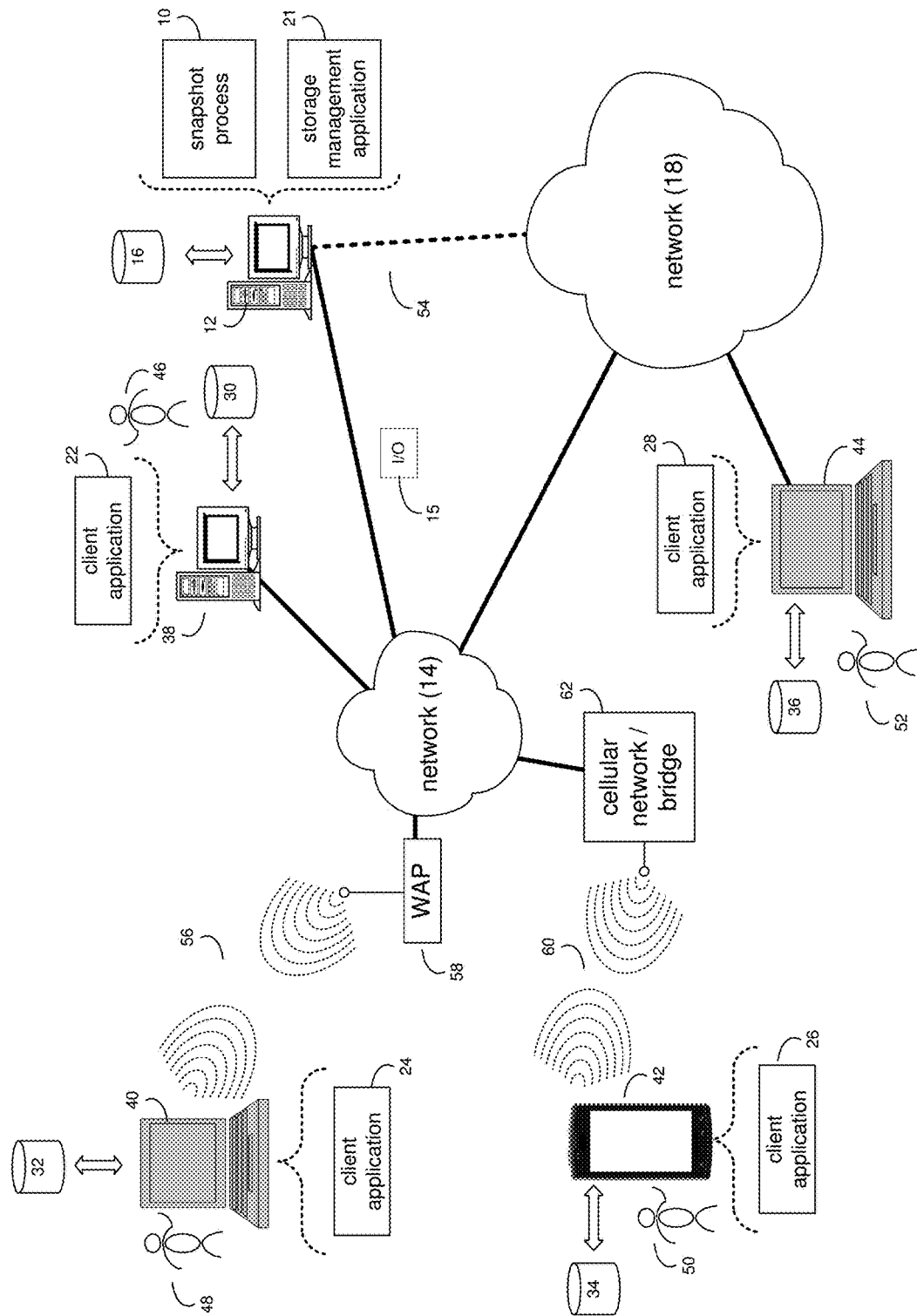
FIG. 1 is an example diagrammatic view of a snapshot process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown snapshot process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a snapshot process, such as snapshot process 10 of FIG. 1, may create, by a computing device, a snapshot related to a snapshot family, wherein an inheritance tree may be maintained for each snapshot family. A write to the snapshot may be received. A hash-based overwrite mapping data structure may be updated based upon, at least in part, receiving the write to the snapshot.

In some implementations, the instruction sets and subroutines of snapshot process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, snapshot process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, snapshot process 10 and/or storage management application 21 may be accessed via one or more of client applications 22, 24, 26, 28. In some implementations, snapshot process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within snapshot process 10, a component of snapshot process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of snapshot process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of snapshot process 10 (and vice versa). Accordingly, in some implementations, snapshot process 10 may be a purely server-side application, a purely client-side application, or a hybrid server-side/client-side application that is cooperatively executed by one or more of client applications 22, 24, 26, 28 and/or snapshot process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, snapshot process 10, and storage management application 21, taken singly or in any combination, may effectuate some or all of the same functionality, any description of effectuating such functionality via one or more of client applications 22, 24, 26, 28, snapshot process 10, storage management application 21, or combination thereof, and any described interaction(s) between one or more of client applications 22, 24, 26, 28, snapshot process 10, storage management application 21, or combination thereof to effectuate such functionality, should be taken as an example only and not to limit the scope of the disclosure.

In some implementations, one or more of users 46, 48, 50, 52 may access computer 12 and snapshot process 10 (e.g., using one or more of client electronic devices 38, 40, 42, 44) directly through network 14 or through secondary network 18. Further, computer 12 may be connected to network 14 through secondary network 18, as illustrated with phantom link line 54. Snapshot process 10 may include one or more user interfaces, such as browsers and textual or graphical user interfaces, through which users 46, 48, 50, 52 may access snapshot process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
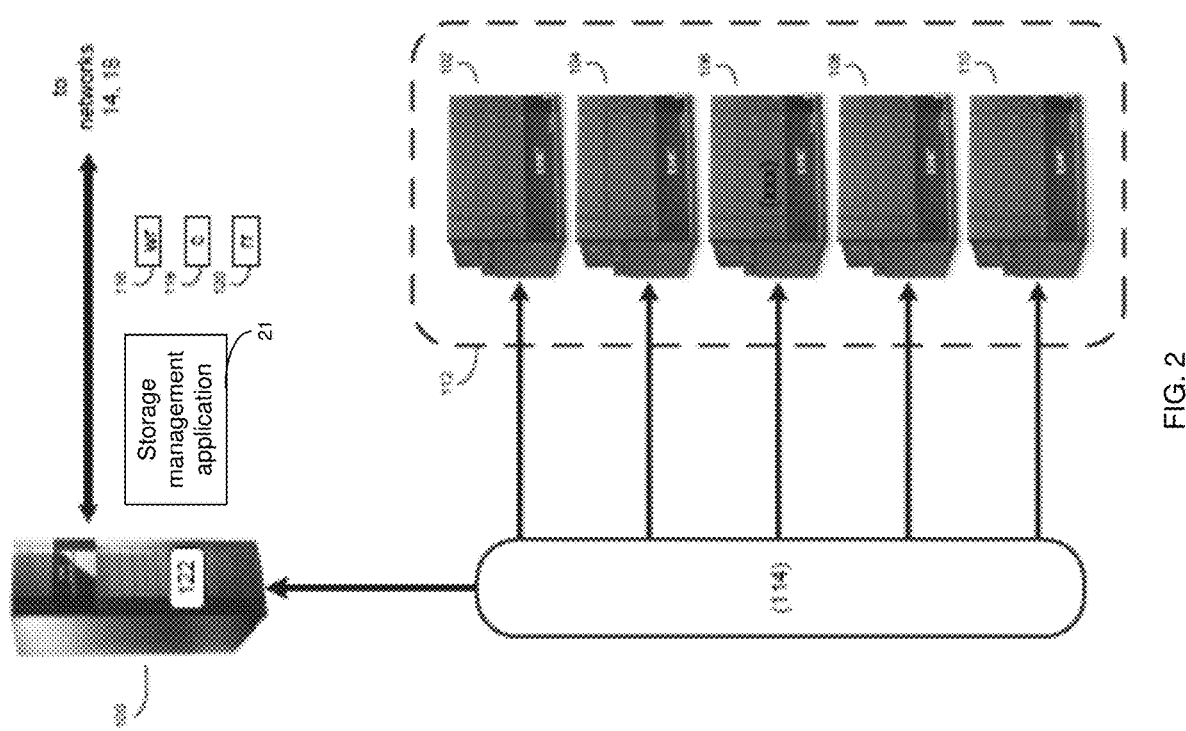
FIG. 2 is an example diagrammatic view of a storage system of FIG. 1 according to one or more example implementations of the disclosure.
Figure 3:
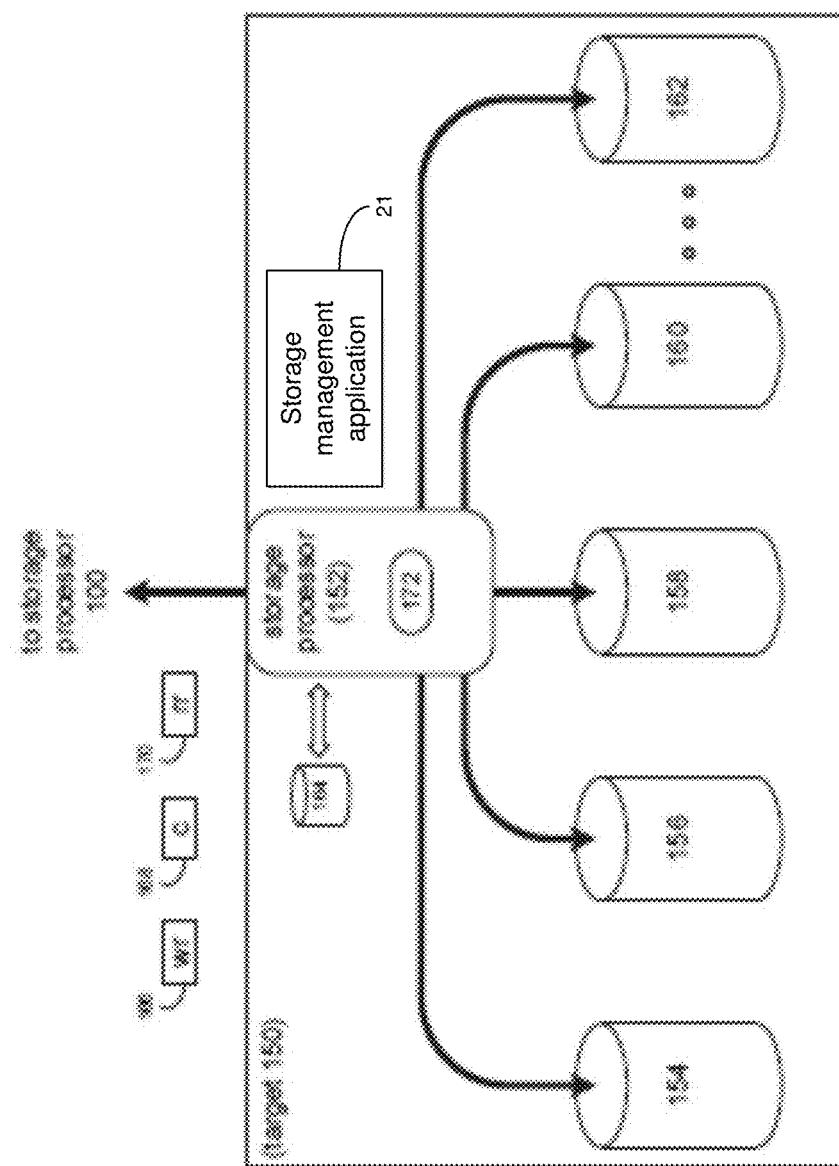
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniB and network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or snapshot process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Some storage clusters may apply a "copy-on-update metadata" method when creating a snapshot. This may have many example and non-limiting advantages, such as, e.g., it does not require any data copies, as just the metadata is involved, and the actual metadata (MD) page copying is made just when (and if) the new write operation is performed either to the original volume or to the snapshot and the corresponding MD page is diverged. However, this method may also create example and non-limiting problems and inefficiencies.

For example, in many input patterns, just (relatively) very small amounts of logical addresses is overwritten in a snapshot (e.g., asynchronous replication). At the same time, even if the only address in the MD page (Leaf) was changed, the full MD page (e.g., 512 pointers, 4KB) must be copied to the snapshot. So, there is potentially produced a lot of similar MD pages and hence waste the cluster physical capacity for MD pages that practically duplicate each other. Also, this may result in wasting other system resources (e.g., CPU cycles) to duplicate the pages. Maintaining references to the parent (source) MD page and different MD page flavors (like "source", "copy", etc.) is very complex. Also, it interferes with deduplication or "dedupe" features (e.g., actual reference count of some unique data page is not just the number of times this page is referenced in different MD pages, it also should take in account all the snapshot pages that have references to the parent (source) MD page). Handling of those MD page dependencies and cross-references is very complex and it involves essential processing burden and resources wasting.

As such, as will be discussed below, the present disclosure may enable optimizing capacity and performance for sparse snapshots by using hierarchical family tree and hash-based overwrite mapping. A hierarchy/inheritance tree (IT) may be introduced to maintain the snapshot tree structure. Creation of the snapshot may only require the update of the IT. When overwriting, the system may create mapper metadata (e.g., Top, Mid, Leaf) only for the specific logical block address (LBA) that was overwritten. There is no need to copy of other, non-overwritten entries from the ancestor (as they may remain invalid in the newly created metadata or may be compacted). As well, a new compact data structure hash-based overwrite mapping (HBOM) may be introduced to keep track of the inheritance rules for each specific offset inside the snapshots family. Dedupe flows may be fully decoupled from the snapshotting flows.

Figure 4:
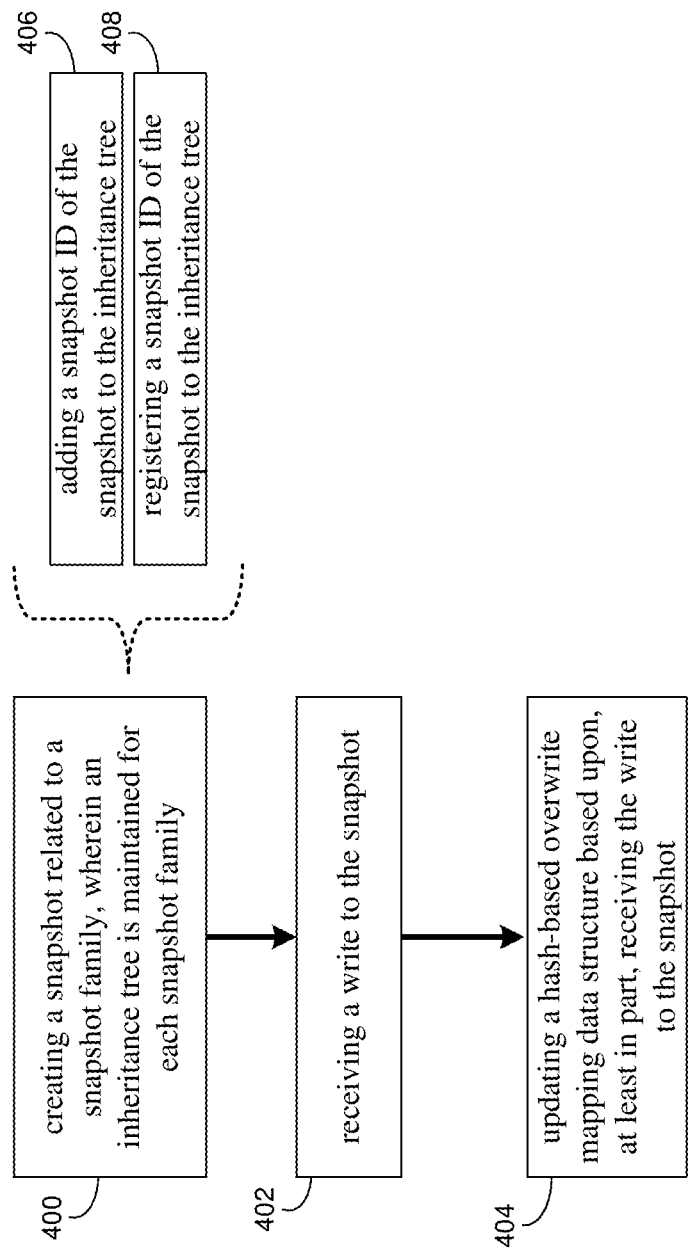
FIG. 4 is an example flowchart of a snapshot process according to one or more example implementations of the disclosure.

The Snapshot Process:

As discussed above and referring also at least to the example implementations of FIG. 4, snapshot process (SP) 10 may create 400, by a computing device, a snapshot related to a snapshot family, wherein an inheritance tree may be maintained for each snapshot family. SP 10 may receive 402 a write to the snapshot. SP 10 may update 404 a hash-based overwrite mapping data structure based upon, at least in part, receiving the write to the snapshot.

Figure 5:
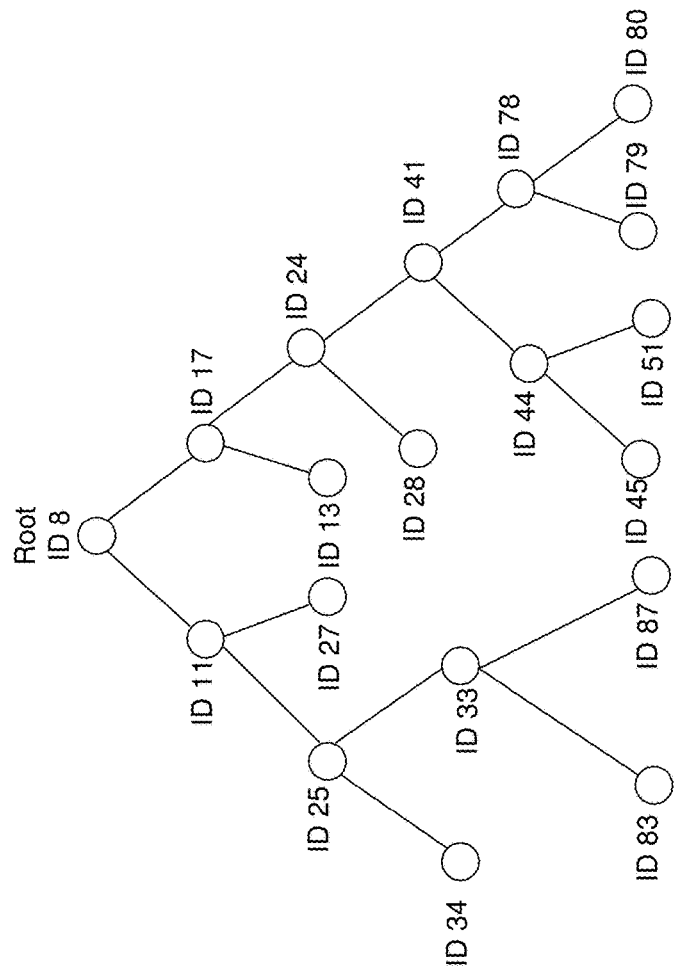
FIG. 5 is an example diagrammatic view of an inheritance tree according to one or more example implementations of the disclosure.

In some implementations, snapshot process (SP) 10 may create 400, by a computing device, a snapshot related to a snapshot family, wherein an inheritance tree may be maintained for each snapshot family, and in some implementations, creating the snapshot may include one of adding 406 and registering 408 a snapshot ID of the snapshot to the inheritance tree. For instance, a hierarchy/inheritance tree (IT) may be maintained for each volume/snapshot family. An example IT 500 is shown in the example implementation of FIG. 5. This structure may allow for SP 10 to determine the parents (recursively) for each snapshot related to the family. When creating 400 the snapshot, the only action performed upon snapshot creation may be either adding 406 and/or registering 408 of the new snapshot ID (i.e., adding the "snapshot ID" record to the corresponding place in the IT and/or registering the snapshot ID record in the corresponding place in the IT). For instance, IT 500 shows the root snapshot (volume) ID as 8. The root has two children (snapshot ID 11 and snapshot ID 17). Snapshot ID 11 has two children (e.g., snapshot ID 25 and snapshot ID 27), etc.

In some implementations, a mapping metadata page for the snapshot may include one of changed and overwritten pointers. For example, the mapping metadata (MD) page's (leaf's) for the newly created snapshot may include only the actually changed/overwritten pointers.

In some implementations, the mapping metadata page may be split when overflowed. For example, the MD pages may be created on demand and may be split when overflowed. For example, all the pointers (i.e., LBA:PL pairs) may be written to this page by SP 10, until it is overflowed. Then, the page may be split (by SP 10) into two pages and all the entries contained in the split (old) page may be distributed between two pages (old and new one). For instance, for each entry (LBA) from the "old" page, its new target LI may be calculated based on PMAP that is updated as a result of the split. In some implementations, it may always be either LI_old or LI_split. Note that since all the PI arithmetic is based on hash functions, it provides even distribution of entries between pages.

Generally, IT 500 defines the order of updates to search in the hash-based overwrite mapping data structure (HBOM) described below. Each snapshot creation adds one or two new IDs. The parent becomes non-writeable. For example, referring to IT 500, when the snapshot ID 79 was created, its parent (i.e., snapshot ID 78) became non-writeable (i.e., read-only), so actually 78 is split into snapshot ID 78, and snapshot ID 80. And the volume, associated with snapshot ID 78 is remapped to snapshot ID 80, so all operations on the volume mapped on snapshot ID 78 will be now performed on snapshot ID 80. So the snapshot ID 80 is a replacement for snapshot ID 78, and snapshot ID 79 is the newly created snapshot, and SP 10 may create/map this new volume associated with this snapshot. From the other side, if SP 10 does not need to continue writing on parent snapshot ID 78 (say the snapshot is used just as a backup), SP 10 may avoid creating snapshot ID 80, and then snapshot ID 78 will have the only child snapshot ID 79.

In some implementations, SP 10 may receive 402 a write to the snapshot, and in some implementations, SP 10 may update 404 a hash-based overwrite mapping data structure based upon, at least in part, receiving the write to the snapshot. For example, SP 10 may receive 402 a write for the created snapshot. As such, the hash-based overwrite mapping (HBOM) data structure may need to be updated 404, as it may track information associated with the snapshot and its associated snapshot family. For example, in some implementations, the hash-based overwrite mapping data structure may track overwritten addresses for each snapshot inside the inheritance tree. For instance, the above noted and new type of metadata pages (HBOM) may keep track of overwritten addresses per each specific snapshot inside the family tree.

In some implementations, the hash-based overwrite mapping data structure may identify whether offsets were overwritten inside the snapshot (e.g., whether this offset was overwritten inside the specific snapshot) and if not, in some implementations, the hash-based overwrite mapping data structure may identify the snapshot from which the offsets is inherited (e.g., what is the closest ancestor of this snapshot in the IT where this offset was overwritten). In other words, the HBOM may identify what is the snapshot/volume that this specific offset is inherited from (and accordingly should be read from). That is, in combination with IT 500, the HBOM gives the list of snapshot IDs where the specific update occurred, and IT 500 defines the order of search/inheritance (e.g., if reading offset LBA1 from snapshot ID 87, the HBOM indicates that it was updated/written in snapshot ID 13, snapshot ID 17, snapshot ID 24, snapshot ID 25, snapshot ID 83, snapshot ID 8, and IT 500 indicates the order of inheritance/search: e.g., snapshot ID 87, snapshot ID 33, snapshot ID 25, snapshot ID 11, and snapshot ID 8. So, combing this, SP 10 may determine that this offset is inherited from snapshot ID 25 and SP 10 should read it from there. The HBOM may be organized the "per offset", e.g., say for each offset "what are snapshots where this offset was touched/overwritten?" The opposite mapping data (e.g., for each snapshot: "what offset was overwritten") is located in the snapshot leaf MD pages.

In some implementations, when receiving a write to the snapshot, any write to snapshot/volume flow may involve at least two updates. For example, regular adding/updating of the data pointer in the corresponding snapshot mapping MD page (Leaf), and the updating of the family HBOM that the offset is overwritten inside this snapshot.

In some implementations, when receiving a write to the snapshot, SP 10 may read some logical address (e.g., LBA offset) from the snapshot. In some implementations, if the volume is the family root volume, SP 10 may perform the regular read from the volume. However, if the volume is not the family root volume, SP 10 may determine (using the HBOM) what the volume/snapshot is that is the closest ancestor that the offset was overwritten in (e.g., this may be either the target snapshot or one of the target snapshot ancestors), and may read the required offset from the snapshot. For example, as noted above, IT 500 shows the root snapshot (volume) ID as 8. The root has two children (snapshot ID 11 and snapshot ID 17). Snapshot ID 11 has two children (e.g., snapshot ID 25 and snapshot ID 27), etc. As such, if SP 10 reads from offset LBA1 of snapshot ID 87, SP 10 may search for updates for this LBA1 in the following example order, e.g., snapshot ID 87→snapshot ID 33→snapshot ID 25→snapshot ID 11→snapshot ID 8. The first found is used for reading. That is, the attached example, say, for snapshot 87, SP 10 may search for the offset update in the following order 87-33-25-11-8. The first found snapshot, that has the offset updated is used for the read. In some implementations, the HBOM may be a compact structure and so most likely the HBOM may be entirely cached, so searching in the HBOM for this information may be a non-expensive operation.

In some implementations, a hash based one level mapping method may be applied for the HBOM metadata pages store. For instance, the logical index (LI) of the HBOM page responsible for some offset inside the snapshot may be defined by a hash function of this offset and the HBOM Volume Existing MD Page Map (PMAP) array. The HBOM pages may be created on demand when the current page is overflowed and split. When the one level of mapping pages is applied, there may not be any hierarchy and indirection. Any MD page may contain just direct pointers to the data (or to intermediate virtual layer), and no pointers to other mapping pages. The Logical Index (LI) of the MD page responsible on any specific address (LBA) may be univocally defined by two values/objects: LBA itself and Volume Existing MD Page Map (PMAP). Note that the LI of the page may define its physical location.

The PMAP structure may be maintained for each storage volume. The PMAP is intended to map the relative MD page index (PI) inside the volume to the MD page Logical Index (LI), that have system wide meaning and defines physical MD Page location. If the mapping for some PI does not exist (i.e., is NULL), this mean that this MD page (i.e., the page with this PI) does not exist.

The PMAP may be an array of LI's, where PI is index in the array, so LI=PMAP[PI]. The PMAP may contain the depth attribute that indicates the current size of the PMAP array. 2**Depth=current PMAP size. Logically, PI's form the Binary Tree and PMAP is just the array representation of this Binary Tree, and PMAP Depth is the depth of this tree.

In some implementations, each HBOM record may contain information about an offset update across all of the family. That is, it contains indications of all the snapshots, related to the family where this offset was overwritten, except the family root. So, the only record that is required to be read to ask the HBOM is what volume/snapshot is the closest ancestor that the offset was overwritten in.

In some implementations, the HBOM may contain the pairs "Offset: DMap", where "Offset" is the target offset, and "DMap" describes all the family snapshots where this offset was written. The DMap format may be flexible and optimized for any specific "number_overwrites vs maximal_family_size" ratio. The format of the DMap is reconsidered (and changed if needed) upon any update of the record (e.g., add dirty/overwrite mark for some snapshot). Below are example and non-limiting DMAP formats:

List of "dirty snapshots": "Offset:NI,A,B,C . . . ", where "NI" is number of elements (indexes) in the list; "A", "B", "C" are indexes of snapshots where this offset is dirty. This format is efficient, when the number of dirty indexes is small.

The negative list: The same as the previous, just the list contains "clean" snapshots ID (i.e., snapshots where this offset was not written) instead of the dirty ones. This format is efficient when most of snapshots are dirty for this "Offset".

Bitmap: "Offset:Dbitmap"; "Dbitmap" is the bitmap, where each bit indicates whether the offset in the corresponding snapshot is dirty or not. This format is efficient when the number of dirty snapshots for the offset is about half of the maximal number of snapshots in the family and also this maximal number is relatively low. Say, for 256 snapshots in family, there may only be needed 32 bytes for Dbitmap (256=32*8).

When deleting the snapshot, the delete flow may include the mapping MD pages related to the snapshot being deleted (or merged with child if there is one), the HBOM reference related to this snapshot may also be removed (or replaced by child references if merged to child). For deduplication of reference counter handling, no specific reference handling is required. That is, when an offset in the specific snapshot is deleted (actually deleted, not just merged to another snapshot), the reference count of the corresponding data page may be decremented.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   creating, by a computing device, a snapshot related to a snapshot family, wherein an inheritance tree is maintained for each snapshot family;
   receiving a write to the snapshot, wherein a mapping metadata page for the snapshot includes one of changed and overwritten pointers; and
   updating a hash-based overwrite mapping data structure based upon, at least in part, receiving the write to the snapshot.

2. The computer-implemented method of claim 1 wherein creating the snapshot includes one of adding and registering a snapshot ID of the snapshot to the inheritance tree.

3. The computer-implemented method of claim 1 wherein the mapping metadata page is split when overflowed.

4. The computer-implemented method of claim 1 wherein the hash-based overwrite mapping data structure tracks overwritten addresses for each snapshot inside the inheritance tree.

5. The computer-implemented method of claim 4 wherein the hash-based overwrite mapping data structure identifies whether offsets were overwritten inside the snapshot.

6. The computer-implemented method of claim 5 wherein the hash-based overwrite mapping data structure identifies the snapshot from which the offsets is inherited.

7. A computer program product residing on a non-transitory computer readable storage medium having a plurality of instructions stored thereon which, when executed across one or more processors, causes at least a portion of the one or more processors to perform operations comprising:
   creating a snapshot related to a snapshot family, wherein an inheritance tree is maintained for each snapshot family;
   receiving a write to the snapshot, wherein a mapping metadata page for the snapshot includes one of changed and overwritten pointers; and
   updating a hash-based overwrite mapping data structure based upon, at least in part, receiving the write to the snapshot.

8. The computer program product of claim 7 wherein creating the snapshot includes one of adding and registering a snapshot ID of the snapshot to the inheritance tree.

9. The computer program product of claim 7 wherein the mapping metadata page is split when overflowed.

10. The computer program product of claim 7 wherein the hash-based overwrite mapping data structure tracks overwritten addresses for each snapshot inside the inheritance tree.

11. The computer program product of claim 10 wherein the hash-based overwrite mapping data structure identifies whether offsets were overwritten inside the snapshot.

12. The computer program product of claim 11 wherein the hash-based overwrite mapping data structure identifies the snapshot from which the offsets is inherited.

13. A computing system including one or more processors and one or more memories configured to perform operations comprising:
creating a snapshot related to a snapshot family, wherein an inheritance tree is maintained for each snapshot family;
receiving a write to the snapshot, wherein a mapping metadata page for the snapshot includes one of changed and overwritten pointers; and
updating a hash-based overwrite mapping data structure based upon, at least in part, receiving the write to the snapshot.

14. The computing system of claim 13 wherein creating the snapshot includes one of adding and registering a snapshot ID of the snapshot to the inheritance tree.

15. The computing system of claim 13 wherein the mapping metadata page is split when overflowed.

16. The computing system of claim 13 wherein the hash-based overwrite mapping data structure tracks overwritten addresses for each snapshot inside the inheritance tree.

17. The computing system of claim 16 wherein the hash-based overwrite mapping data structure identifies whether offsets of the overwritten addresses were overwritten inside the snapshot and identifies the snapshot from which the offsets is inherited.

* * * * *